US008577083B2

(12) United States Patent
Kirk

(10) Patent No.: US 8,577,083 B2
(45) Date of Patent: Nov. 5, 2013

(54) GEOLOCATING OBJECTS OF INTEREST IN AN AREA OF INTEREST WITH AN IMAGING SYSTEM

(75) Inventor: James C. Kirk, Clarksville, MD (US)

(73) Assignee: Honeywell International Inc., Morristown, NJ (US)

( * ) Notice: Subject to any disclaimer, the term of this patent is extended or adjusted under 35 U.S.C. 154(b) by 962 days.

(21) Appl. No.: 12/626,430

(22) Filed: Nov. 25, 2009

(65) Prior Publication Data

US 2011/0122257 A1 May 26, 2011

(51) Int. Cl.
*G06K 9/00* (2006.01)
(52) U.S. Cl.
USPC ............................................. 382/103
(58) Field of Classification Search
None
See application file for complete search history.

(56) References Cited

U.S. PATENT DOCUMENTS

| | | | |
|---|---|---|---|
| 6,970,183 B1 | 11/2005 | Monroe | |
| 7,042,494 B2 | 5/2006 | Broemmelsiek et al. | |
| 7,209,161 B2 | 4/2007 | Thal et al. | |
| 7,522,765 B2 | 4/2009 | Taylor | |
| 7,720,257 B2* | 5/2010 | Morellas et al. | 382/103 |
| 7,995,098 B2* | 8/2011 | Pedeville et al. | 348/190 |
| 2003/0053658 A1* | 3/2003 | Pavlidis | 382/103 |
| 2003/0123703 A1 | 7/2003 | Pavlidis et al. | |
| 2005/0073585 A1 | 4/2005 | Ettinger et al. | |
| 2006/0244830 A1 | 11/2006 | Davenport et al. | |
| 2007/0019073 A1 | 1/2007 | Comaniciu et al. | |
| 2007/0039030 A1 | 2/2007 | Romanowich et al. | |
| 2007/0052803 A1 | 3/2007 | Chosak et al. | |
| 2008/0074494 A1 | 3/2008 | Nemethy et al. | |
| 2008/0291278 A1 | 11/2008 | Zhang et al. | |
| 2009/0087029 A1* | 4/2009 | Coleman et al. | 382/103 |
| 2010/0085437 A1* | 4/2010 | Troy et al. | 348/211.7 |
| 2010/0128110 A1* | 5/2010 | Mavromatis | 348/47 |
| 2011/0122257 A1* | 5/2011 | Kirk | 348/187 |

OTHER PUBLICATIONS

Chai, L. et al. "3-D Motion and Structure Estimation Using Inertial Sensors and Computer Vision for Augmented Reality," Presence: Teleoperators and Virtual Environments, Oct. 2002, MIT Press, Cambridge (40 pgs.).
Bhanu, B. et al., "Integrated Binocular and Motion Stereo in An Inertial Navigation Sensor-Based Mobile Vehicle," Proceedings of the International Symposium on Intelligent Control, Aug. 11-13, 1992, IEEE, New York (6 pgs.).
Armesto et al., "Multi-rate fusion with vision and inertial sensors", Robotics and Automation, 2004. Proceedings ICRA '04. 2004 IEEE International Conference on New Orleans, LA, Apr. 26-May 1, 2003, vol. 1 (7 pgs.).

(Continued)

*Primary Examiner* — Brian P Werner
*Assistant Examiner* — Tahmina Ansari
(74) *Attorney, Agent, or Firm* — Shumaker & Sieffert, P.A.

(57) ABSTRACT

A system comprises a plurality of fixed cameras that each having a field of regard. Each point within an area of interest is covered by the field of regard of at least two of the cameras. Each camera captures an image of its field of regard and a plurality of calibration points within the area of interest. A processor calibrates the imaging system by at least associating the coordinates of each of the plurality of calibration points with a calibration pixel corresponding to an image of the calibration point in the image of each of the cameras. The processor geolocates the object of interest within the area of interest by at least comparing the location an image of the object of interest to the calibration pixels in the images generated by each of the plurality of cameras.

19 Claims, 4 Drawing Sheets

(56) References Cited

OTHER PUBLICATIONS

Hong, Y. et al., "Detecting and Tracking People by Mobile Robot Using Structured Light Range Sensor," Proceedings of the 2005 IEEE International Conference on Intelligent Robots and Systems, Aug. 2005, IEEE, New York (6 pgs.).

Pages, J. et al., "A camera-projector system for robot positioning by visual servoing," Proceedings of the 2006 Conference on Computer Vision and Pattern Recognition Workshop, Jun. 2006, IEEE, New York (8 pgs.).

Bryson, M. et al, "Active Airborne Localisation and Exploration in Unknown Environments using Inertial SLAM," Proceedings of the 2006 IEEE Aerospace Conference, Mar. 4, 2006, IEEE, New York (14 pgs.).

Jia, Z et al., "Vision based data fusion for autonomous vehicles target tracking using interacting multiple dynamic models," Computer Vision and Image Understanding, Dec. 23, 2006, vol. 109, No. 1, Elsevier Science Inc., New York (22 pgs.).

Miro, J.M. et al., "Towards Vision Based Navigation in Large Indoor Environments," Proceedings of the 2006 IEEE International Conference on Intelligent Robots and Systems, Oct. 2006, IEEE, New York (8 pgs.).

\* cited by examiner

GEOLOCATING OBJECTS OF INTEREST IN AN AREA OF INTEREST WITH AN IMAGING SYSTEM

STATEMENT REGARDING FEDERALLY SPONSORED RESEARCH OR DEVELOPMENT

This invention was made with Government support under Contract No. 5002605993 awarded by United States Army Research Laboratory and the United Kingdom Ministry of Defense. The Government has certain rights in the invention.

TECHNICAL FIELD

This disclosure relates to observing and tracking objects of interest.

BACKGROUND

In some civilian and military security operations, as well as in military combat arenas, it can be useful to accurately determine the absolute coordinates, or "geolocate," objects of interest (OOIs), such as enemy troops or vehicles, within a particular area of interest. Absolute coordinates of an OOI can be determined for various purposes, including focusing more powerful imaging systems or for the placement of precision guided weapons to a target.

SUMMARY

In general, the disclosure is directed to systems and techniques for geolocating objects of interest within an area of interest with an imaging system. The imaging system includes a plurality of cameras each having a field of regard. The area of interest is covered by the field of regard of at least two of the cameras. In addition, the disclosure is directed to systems and techniques for calibrating the imaging system using calibration points located within the area of interest.

In one aspect, the disclosure is directed to a system comprising a plurality of fixed cameras each having a field of regard, wherein each point within an area of interest is covered by the field of regard of at least two of the plurality of cameras, and wherein each of the plurality of cameras captures a video image of its respective field of regard, a plurality of calibration points within the area of interest, and a processor that calibrates the system by at least associating coordinates of each of the plurality of calibration points with a calibration pixel corresponding to an image of the calibration point in the video image of each of at least two cameras of the plurality of cameras, wherein the processor generates coordinates of an object of interest in the area of interest by at least comparing a position of an image of the object of interest in the video images generated by the at least two cameras of the plurality of cameras to the calibration pixels in the video image of each of the at least two cameras of the plurality of cameras.

In another aspect, the disclosure is to a method for geolocating an object, comprising selecting an area of interest comprising a plurality of points, determining coordinates of each of a plurality of calibration points within the area of interest, with each of a plurality of fixed cameras each having a field of regard, capturing a video image of the field of regard, wherein the area of interest is covered by the field of regard of at least two cameras of the plurality of camera, and wherein each calibration point comprises a single pixel within the video image, associating the coordinates of each calibration point with a calibration pixel corresponding to an image of the calibration point in the video image captured by each of at least two cameras of the plurality of cameras, and determining a geolocation of an object of interest within the area of interest by comparing a position of an image of the object of interest within in the video images generated by each of the at least two cameras of the plurality of cameras to the calibration pixels within the video image generated by each of the at least two camera of the plurality of cameras.

In another aspect, the disclosure directed to a system comprising an aerial vehicle flying over an area of interest, the aerial vehicle comprising a camera with a field of regard covering the area of interest, wherein the camera captures a video image of the field of regard, a plurality of calibration targets placed within the area of interest, wherein the coordinates of each of the calibration targets is known, and a processor that calibrates the system by at least associating coordinates of each of the plurality of calibration targets with a calibration pixel corresponding to an image of the respective calibration target in the video image of the camera, wherein the processor geolocates the coordinates of an object of interest in the area of interest by comparing a position of an image of the object of interest in the video image to the calibration pixels in the video image of the camera.

In another aspect, the disclosure is directed to a computer-readable storage medium comprising instructions. The instructions cause a programmable processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, random access memory or RAM) or any other type of volatile or non-volatile memory that stores instructions (e.g., in the form of a computer program or other executable) to cause a programmable processor to perform the techniques described herein.

The details of one or more examples of the disclosure are set forth in the accompanying drawings and the description below. Other features, objects, and advantages of the systems, methods, and devices in accordance with the disclosure will be apparent from the description and drawings, and from the claims.

DETAILED DESCRIPTION

A video surveillance system and techniques for accurately geolocating objects of interest (OOI) within a given area of interest (AOI) are described herein. The OOI can be a moving OOI or a stationary OOI. Geolocation involves the identification of the real-world geographic location of an OOI within the AOI. In addition to a plurality of cameras, the system described herein includes a processor and one or more imaging calibration targets placed at several calibration points with known coordinates within the AOI. The processor can be located at any suitable location and can receive the video images generated by each of the cameras using any suitable technique. In some examples, the processor is coupled to the cameras via an ad hoc network.

In some examples, the calibration targets are captured as single pixel images in the images generated by each of the cameras of the system. The images can be video images or a plurality of still images captured over a period of time. Video images are primarily described herein. However, the techniques described herein can also apply to a set of still images. The processor associates the coordinates, such as the absolute coordinates, of each calibration point with a calibration pixel in the resulting image of each camera. Once a sufficient number of calibration points have been associated, the processor is able to indicate the geolocation of an OOI within the AOI based off the calibration points by comparing the location of the OOI to the calibration pixel position within the images generated by at least two of the cameras.

The systems described herein geolocate an OOI within an AOI and generate the coordinates, such as the absolute coordinates, of an OOI within the AOI with the accuracy desirable for munitions guidance. In addition, the systems described herein can be set up relatively quickly. For example, the systems described herein can comprise relatively inexpensive and readily available cameras (e.g., off-the-shelf cameras, rather than cameras specially designed for the surveillance system). This can be useful in, for example, the military arena.

Figure 1:
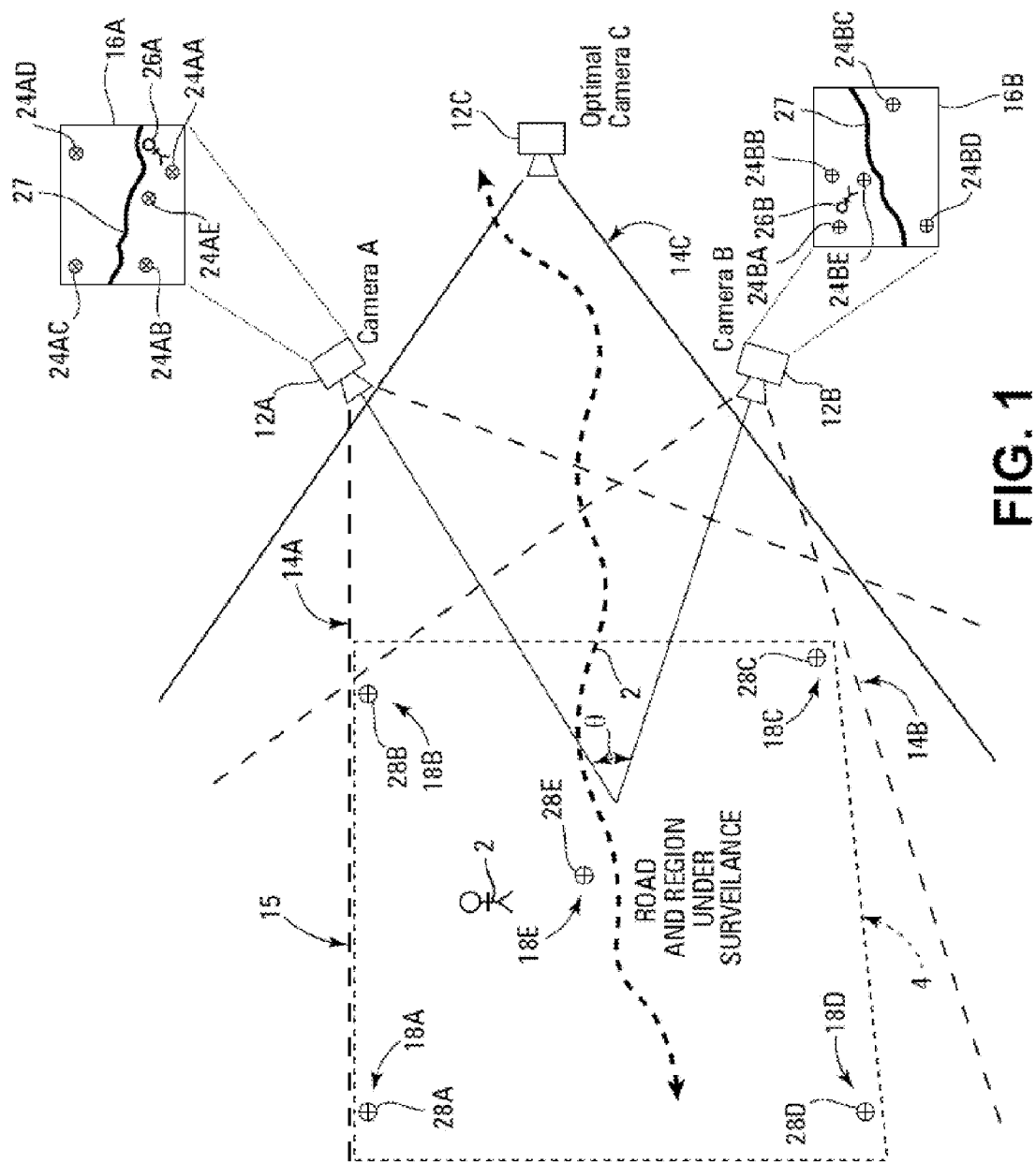
FIG. 1 is an elevated view of an area of interest under surveillance by an example geolocation system.
Figure 2:
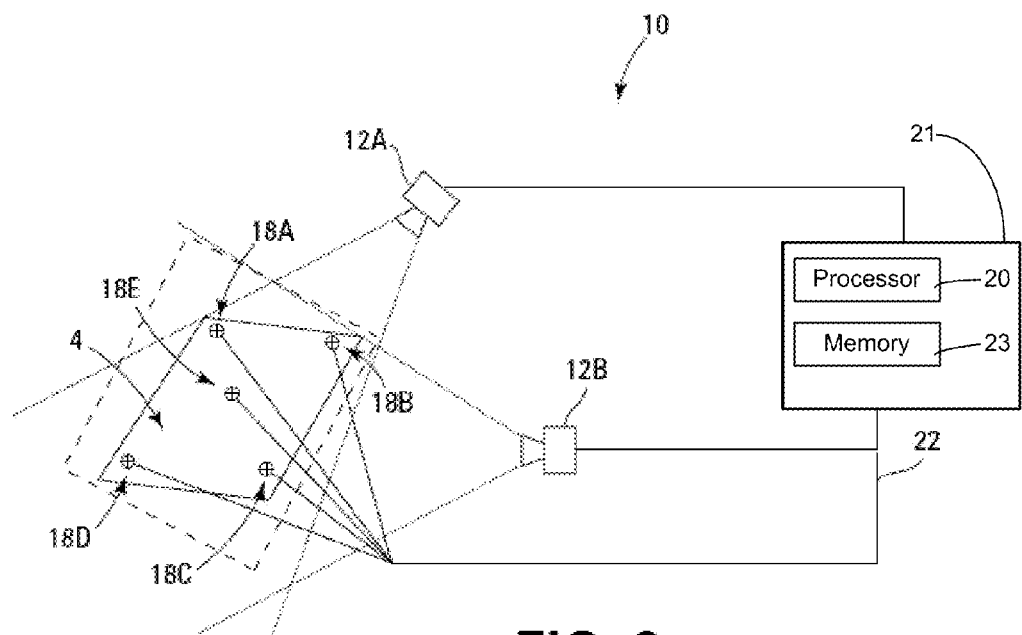
FIG. 2 is a perspective view of the area of interest under surveillance and an example geolocation system.

FIGS. 1 and 2 illustrate an example system 10 for tracking and geolocating an OOI 2 within an AOI 4. OOI can be, for example, a known or unknown person, vehicle, or other object. AOI 4 can be, for example, a secured area, a battlefield or other area for which surveillance and precise location of targets is desirable. System 10 includes a plurality of fixed cameras 12A-12C (collectively referred to as "cameras 12"). Each camera 12A-12C has a field of regard (FOR) 14A-14C, respectively (collectively referred to as "FOR 14"). Each point within AOI 4 is covered by the FOR 14 of at least two of the plurality of cameras 12, such as FOR 14A from camera 12A and FOR 14B from camera 12B as shown in FIG. 1. Each camera 12 captures a video image 16A-16C (collectively referred to as "video images 16") of its FOR 14. For example, a first camera 12A captures video image 16A of its FOR 14A while a second camera 12A captures video image 16B of its FOR 14B.

System 10 also includes a plurality of calibration points 18 within AOI 4, such as calibration points 18A, 18B, 18C, 18D, and 18E shown in FIG. 1. Each calibration point 18 is an actual physical location within AOI 4 where the absolute coordinates of each calibration point 18 is known or can be readily determined. Example calibration points include objects (e.g., trees or portions of a building) within AOI 4, geographic landmarks within AOI 4, or any other object or identifiable point within AOI 4.

System 10 further includes processor 20 (shown in FIG. 2), which is connected to each of the plurality of fixed cameras 12 by a network 22 so that the video images 16 captured by each of the plurality of fixed cameras 12 is transmitted to processor 20. Network 22 can be wired or wireless. Network 22 that connects cameras 12 to central processor 20 can be any network hardware that is capable of transmitting the video image data from cameras 12 and coordinate data from calibration targets 28 to central processor 20 at a bandwidth that is sufficient to allow central processor 20 to calibrate system 10 and to geolocate OOI fast enough to make system 10 useful. Examples of networks that could be used with system 10 of the present invention include hard-wired systems where cameras 12, calibration targets 28, and central processor 20 are directly connected by cables or wires capable of transmitting image data to central processor 20 or by wireless connection. Examples of hard wired systems include closed circuit television (CCTV) systems and wired computer networking methods including coaxial cables, digital subscriber line (DSL), Ethernet, fiber optics, and power line communication.

Wireless systems can use radio, microwave, or infrared technologies for communications. Examples of wireless methods that can be used in network 20 include wireless local area network (WLAN) devices corresponding to IEEE 802.11 standards (commonly referred to as Wi-Fi), mobile telecommunications protocols including global system for mobile communications (GSM), code division multiple access (CDMA) Universal Mobile Telecommunications System (UMTS), Evolution-Data Optimized systems (EV-DO), and Worldwide Interoperability for Microwave Access (WiMAX), and satellite communications. Cameras 12 and central processor 20 can also be connected via a general network, such as the internet, a wide area network (WAN) or metropolitan area network (MAN). If a general network is used, a method of encryption can be used to prevent interception of the camera image data or geolocation data. In one embodiment, wherein system 10 is being used in a military operation, the connection between cameras 12, calibration targets 28, and central processor 20 may be through the Global Information Grid.

Processor 20 can include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. Processor 20 can be incorporated in a computing device, such as the computer 21 shown in FIG. 2 which may be a desktop computer or laptop computer. Computer 21 may also include memory 23, which stores instructions for execution by processor 20, as described below, as well as information about AOI 4, OOI 2, cameras 12 and video image 16, calibration points 18, and calibration targets 28. Memory 23 may include any volatile or non-volatile media, such as a random access memory (RAM), read only memory (ROM), non-volatile RAM (NVRAM), electrically erasable programmable ROM (EEPROM), flash memory, and the like.

In one example, memory 23 stores the location history of OOI 2, and processor 20 can track the path that OOI 2 takes while moving through AOI 4 using the location history of OOI 2 for a particular time frame. In another example, memory 23 stores movement profiles or templates (e.g., a pattern of absolute coordinates over time) that correspond to known movement patterns of various types of OOIs 2 so that processor 20 can compare the location history of a particular OOI 2 to the stored templates and determine whether OOI 2 is permitted within AOI 4 or if OOI 2 is an intruder. For example, a guard patrol may enter AOI 4 at regular intervals and generally follow the same path such that the guard's path may be stored in memory 23 so that if processor 20 determines that based on the location history of OOI 2 in AOI 4, OOI 2 is following the stored path, processor 20 can determine that OOI 2 is permitted. Similarly, memory 23 can store various known or predicted movement profiles or templates of intruders within AOI 4, such as movement in a particular portion of AOI 4 that only intruders would be expected to be and/or in a particular direction that only intruders would be expected to take. Processor 20 can then determine that OOI 2 is an intruder within AOI 4 and provide a notification to a user of system 10.

In another example, memory 23 can also be configured to allow the location history of each OOI 2 to be retrieved and reviewed by a user. For example, processor 20 may be configured to compile the location information of OOI 2 and display it on a map or other representation of AOI 4 so that a user can quickly and easily see the movement of OOI 2. In one embodiment, central processor 20 is part of a computer 21 that is readily available as an asset of opportunity, and all that is necessary to enable the functionality of system 10 is to configure processor 20 to perform the calibration and geolocation calculations described above, such as by configuring the computer with hardware, firmware, software or any combination thereof that permits processor 20 to perform these calculations. Such hardware, software, or firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to processor 20 and, more generally, system 10, may be embodied as instructions on a computer-readable medium such as RAM, ROM, NVRAM, EEPROM, FLASH memory, magnetic data storage media, optical data storage media, or the like. The computer-readable medium may comprise memory 23 shown in FIG. 2, or it may be a separate computer-readable medium. The instructions may be executed to support one or more aspects of the functionality described in this disclosure.

Processor 20 can be physically located anywhere that allows for a connection to cameras 12 and calibration targets 28 via network 22. For example, central processor 20 may be at a base camp (e.g., a military base) near AOI 4, or at a regional headquarters in charge of the region including AOI 4. If long distance networking is possible, central processor 20 can be located further away (e.g., in a different country) at a central command facility or the like.

In some examples, processor 20 calibrates system 10 by associating the absolute coordinates of each of the calibration points 18 with a calibration pixel 24 corresponding to an image of the calibration point 18 in the video image 16 of each of at least two of the cameras 12. An absolute coordinate (also referred to as an absolute location) can be designated using a specific pairing of latitude and longitude coordinates, a Cartesian coordinate grid specific to AOI 4, or another coordinate system that enables calibration points 18 or OOI 2 within AOI 4 to be precisely and accurately located within AOI 4. Absolute coordinates of each of the calibration points 18 or OOI 2 are generally more specific than the relative location of each of the calibration points 18 or OOI 2 within AOI 4. For example, a relative location of a calibration point 18 or OOI 2 within AOI 4 may merely indicate the location of the calibration point 18 or OOI 2 relative to another known object within AOI 4. While this may be useful for generally tracking an OOI within AOI 4 (e.g., generally tracking movement of the OOI within AOI 4) or generally locating an OOI within AOI 4, it may not be useful for pinpoint an OOI for purposes of, for example, guiding munitions to the OOI, guiding the direction of a directed energy beam, monitoring OOI entry into an exclusion zone, and prediction of the intent of the OOI or the future path the OOI may take.

Thus, the terms "coordinates" or "absolute coordinates" refer to the measurement of the actual physical location of a particular point on earth with sufficient accuracy to allow for the focusing of long-range imaging systems or targeting of guided weapon systems. If a sufficient number of cameras 12 are used, then "coordinates" or "absolute coordinates" may also refer to the elevation of a particular point above the earth. The determined absolute coordinates are accurate to within about 7 meters, such as about within about 3 meters or within about 1 meter as compared to the actual location of OOI 2 within AOI 4. Processor 20 can indicate the absolute coordinates using any suitable coordinate system. An example coordinate system includes, but is not limited to, the latest revision of the World Geodetic System as used by most global positioning systems (GPS), which provides a specific pairing of latitude and longitude coordinates, or a Cartesian coordinate grid specific to AOI 4 and known to processor 20.

In the embodiment shown in FIG. 1, processor 20 associates the absolute coordinates of calibration point 18A with calibration pixel 24AA in video image 16A of camera 12A and with calibration pixel 24BA in video image 16B of camera 12A. This calibration by association of absolute coordinates of calibration points 18 to calibration pixels 24 of images generated by each camera 12 is repeated with each of the calibration points. For example, processor 20 associates calibration point 18B to calibration pixel 24AB in video image 16A and 24BB in video image 16B, calibration point 18C with calibration pixel 24AC in video image 16A and 24BC in video image 16B, and so on with the remaining calibration points 18D and 18E.

Processor 20 is further configured to geolocate the absolute coordinates of OOI 2 within AOI 4 by comparing the location of image 26 of OOI 2 in video image 16 of at least one of the cameras 12 to calibration pixels 24 in video images 16 of at least two the cameras 12. In the embodiment shown in FIG. 1, OOI 2 is shown as a person. At least two of the cameras 12 capture OOI 2 as an image, e.g., image 26A of the person in video image 16A of first camera 12A and an image 26B of the person in video image 16B of second camera 12B. In some embodiments, not only are the absolute coordinates of OOI 2 determined for the present location of OOI 2, but the location history of OOI 2 while it is within AOI 4 is stored, for example in a computer-readable medium such as a computer hard drive or flash memory storage, and processor 20 is further configured to perform a behavioral evaluation of OOI 2 and predict the intent of OOI 2 and/or the future path that OOI 2 will take.

The overlapping FORs 14 of cameras 12 allows processor 20 to create a single field of calibration (FOC) 15 that covers the entire AOI 4. In order to provide precise geolocation (e.g., absolute coordinates), such as the geolocation necessary to place precision guided weapons on target, processor 20 calibrates system 10. Calibration is possible because processor 20 can readily determine the absolute coordinates of each calibration point 18, e.g., by referencing the coordinates in memory or determining the coordinates using a global positioning system or another positioning system. Each calibration point 18 is visible to at least two of the plurality of cameras 12, e.g., is within the field of view of each of the cameras 12.

In one embodiment, each of the calibration points 18 are visible to at least two cameras 12 through the use of reflective calibration targets 28. Other types of calibration targets are contemplated. In some examples, cameras 12 generate image 16 in which a particular calibration target 28 is observed as a single pixel 24, which is located at a particular position within camera video image 16.

Figure 4:
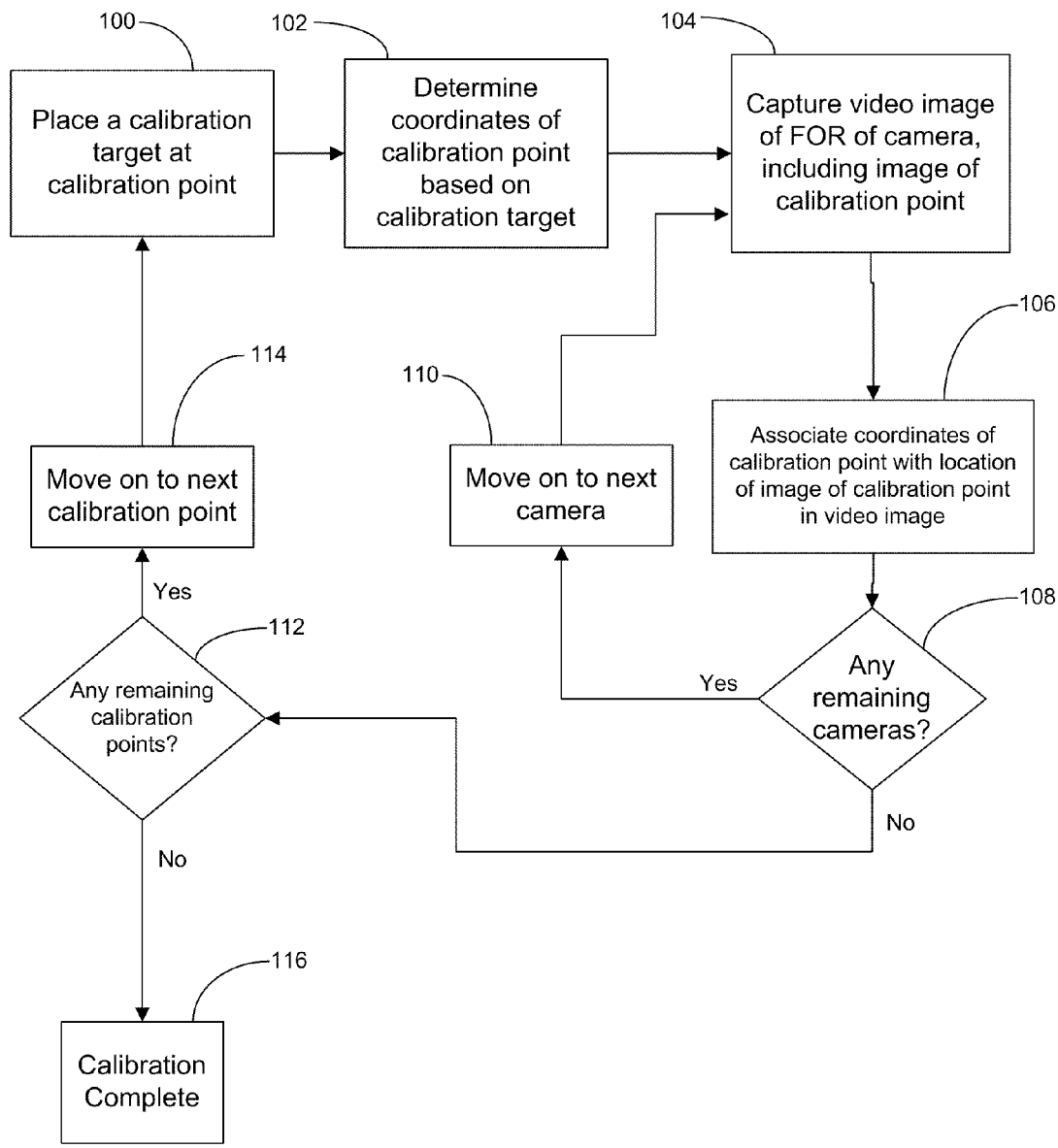
FIG. 4 is a flowchart showing an example method of calibrating the geolocation system of FIG. 1.

An example method of calibrating system 10 is shown generally in FIG. 4. In the example method, calibration is accomplished by associating the absolute coordinates of each calibration point 18 with a calibration pixel 24 within each video image 16. This process is repeated with each calibration point 18 that is viewed by each camera 12. In this way, once the association is complete for all calibration points 18, a database of the associations between calibration points 18 and calibration pixels 24 is created to be used for subsequent calculation of the absolute coordinates of an OOI 2 within AOI 4. As described in further detail below, absolute coordinates of an OOI 2 within AOI 4 can be determined by, for example, interpolating between the known absolute coordinates of at least three calibration points 18, although additional calibration points can also be used.

In the example method shown in FIG. 4 (described with respect to the system shown in FIG. 1), calibration is started at a first calibration point 18A where the coordinates of first calibration point 18A are determined. In one example, determining the coordinates of the calibration point 18A includes placing a calibration target 28 at calibration point 18A (100), wherein calibration target 28 can include an associated GPS device or another device that indicates the absolute coordinates of calibration point 18A, so that the coordinates of calibration point 18A are determined based on calibration target 28 (102). Calibration target 28 may be manually placed at calibration point 18A by a user who physically brings calibration target 28 into AOI 4 and places it at calibration point 18A. The GPS device (or other coordinate indicating device) associated with calibration target 28 provides the absolute coordinates of calibration point 18A. The GPS device or calibration target 28 or the user may transmit the absolute coordinates of calibration point 18A to processor 20 through network 22.

Next, a first camera 12A captures a video image 16A of its field of regard (FOR) (104), wherein video image 16A includes an image of calibration point 18A, such as by generating an image of a calibration target 28 placed at calibration point 18A. In some examples, processor 20 directs first camera 12A to capture a video image of its FOR. In one example, the image of calibration point 18A is a calibration pixel 24AA within video image 16A of first camera 12A. The coordinates of first calibration point 18A are then associated with the image 24AA of calibration point 18A within video image 16A (106). In some examples, processor 20 automatically associates the coordinates of calibration point 18A with image 24AA of calibration point 18A (106). Processor 20 may be configured to recognize calibration target 28 and automatically associate the coordinates of calibration point 18A transmitted from calibration target 28 with the location of image 24AA of calibration point 18A in video image 16A. Alternatively, the location of image 24AA in video image 16A may be manually selected by a user, such as by placing a cursor on the location of image 24AA on a display connected to processor 20 that prompts association of the coordinates of calibration target 28 with the selected location of image 24AA. In one example, the user who places calibration target 28 is the same user who manually selects the location of image 24AA in video image 16A through the use of a portable computing device that includes processor 20 or is in communication with processor 20.

Next, it is determined if any other cameras 12 include an image of first calibration point 18A (108). As with the previous steps, in some examples, processor 20 automatically determines if any other cameras 12 include an image of first calibration point 18A (108). If there are additional cameras that view the calibration point, such as a second camera 12B, processor 20 (or a user) moves on to the next camera (110). The video image including an image of calibration point 18A is captured for the additional camera (104) and the coordinates of the calibration point 18A (e.g., as indicated by calibration target) are associated with the image of the calibration point viewed by the respective camera (106). For example, after the coordinates of first calibration point 18A have been associated with the location of the image 24AA of calibration point 18A in video image 16A of a first camera 12A, a video image 16B is captured of the FOR of second camera 12B that includes an image of first calibration point 18A, such as a calibration pixel 24BA (104). The coordinates of calibration point 18B are then associated with the location of the image 24BA of calibration point 18A in video image 16B of second camera 18B (106). Once again, it is determined if there are any cameras remaining with images of calibration target 18A that have not been calibration (108) and the process of associating coordinates of a calibration point with an image of the calibration point in an image generated by a camera are repeated for any such remaining cameras until it is determined that no cameras 12 that need to be calibrated remain with respect to the calibration point 18A under consideration.

If there are no remaining cameras that generate an image of calibration point 18A, then processor 20 determine if there are any calibration points 18 that are left to be calibrated (112). If there is a remaining calibration point, such as a second calibration point 18B, then processor 20 (alone or with the aid of a user) repeats the calibration technique associated with blocks 100, 102, 104, 106, 108 and 110 in FIG. 4 for calibration point 18B and any cameras 12 that include an image of calibration point 18B in their video image 16 (step 114).

For example, a calibration target 28 may be placed at calibration target 18B (100) and the coordinates of calibration point 18B may be determined based on calibration target 28 (102), e.g., based on absolute coordinates provided by calibration target 28. Calibration target 28 used in steps 100 and 102 with respect to second calibration point 18B may be the same calibration target 28 used with respect to first calibration point 18A that is moved to second calibration point 18B after calibration of first calibration point 18A is complete, or a different calibration target 28 may be used so that calibration of calibration points 18A and 18B may be performed rapidly or even simultaneously.

Video images 16A, 16B of cameras 12A, 12B are captured that include images of calibration target 18B (104), such as a calibration pixel 24AB in video image 16A and calibration pixel 24BB in video image 16B. The video images 16A, 16B captured for the calibration with respect to second calibration point 18B may be the same video images 16A, 16B that were captured with respect to first calibration point 18B, or a new video image 16A, 16B may be captured for each camera 12A, 12B. The absolute coordinates of second calibration point 18B is associated with the images 24AB, 24BB of calibration target 18B within video images 16A, 16B just as the coordinates of first calibration point 18A were associated with images 24AA and 24BA in step 106, as described above.

The calibration technique shown in FIG. 4 can be repeated for all remaining calibration points, such as third calibration point 18C, fourth calibration point 18D, and fifth calibration point 18E, until it is determined at that there are no remaining uncalibrated calibration points 18 (112), at which point the calibration technique shown in FIG. 4 is complete (116). The technique shown in FIG. 4 may be performed automatically by processor 20, or manually by users of the system.

Video images 16A, 16B are transmitted to processor 20 via network 22, and processor 20 associates the absolute coordinates of first calibration point 18A, which are either previously known or are determined by a GPS device at calibration point 18A, with calibration pixel 24AA in video image 16A and with calibration pixel 24BA in video image 16B. This association and calibration is repeated for the absolute coordinates for second calibration point 18B with calibration pixels 16AB and 16BB, third calibration point 18C with calibration pixels 16AC and 16BC, fourth calibration point 18D with calibration pixels 16AD and 16BD, and fifth calibration point 18E with calibration pixels 16AE and 16BE.

Once each the absolute coordinates of each calibration point 18 is associated with a calibration pixel 24 within the video image 16 of each camera 12, processor 20 can geolocate and generate absolute coordinates for the location of OOI 2 within AOI 4. For example, processor 20 can compare the position of an image of OOI 2 within the video image 16 of each of at least two cameras 12, such as image 26A in first video image 16A and image 26B in second video image 16B, and interpolate the absolute coordinates of the location of OOI 2 via triangulation and trilateration. If the situation warrants, it may be assumed that an OOI 2 is on the ground, which permits geolocation with fewer cameras 12 and camera elevations, and fewer calibration points 18.

Processor 20 can calibrate geolocation system 10 using any suitable number of calibration points 18. The desirable number of calibration points 18 depends on the complexity of the terrain, the size, and the shape of AOI 4. For example, a generally flat AOI 4 with a generally rectangular shape, as shown in FIG. 2, can require only three calibration points 18 because three points on the flat terrain define a curve and are useful for triangulating a location of OOI 2 within AOI 4. However, with more complex terrains, it can be useful to include more than three calibration points 18, such as at least five calibration points 18. The example shown in FIGS. 1 and 2 includes five calibration points 18, with one calibration point 18A, 18B, 18C, 18D being located generally at each corner of AOI 4 and an additional calibration point 18E located generally in the center of AOI 4. As terrain complexity increases, such as with hilly terrain, more calibration points may be necessary or desirable to better calibrate system 10 and more precisely and accurately generate absolute coordinates for OOI 2. In another example, shown in FIG. 1, if AOI 4 includes a road 6 that is to be monitored for suspicious traffic, calibration points are only needed along road 6, even though the FORs 14 of cameras 12 cover a much larger area. In this case, calibration can be accomplished by using calibration points at various points along road 6.

The absolute coordinates of each calibration point 18 can be determined by a relative reference to a known benchmark or by use of an absolute reference. An example of a relative reference is the comparison of the relative position of a calibration point 18 to the known absolute coordinates of a particular landscape feature or other geographic landmark, such as a tree or a road intersection, or by determining the position of calibration point 18 by comparison to a terrain database that includes locations of one or more points of terrain in AOI 4. An example of an absolute reference includes the use of a GPS device. Once the absolute coordinates of a calibration point 18 is determined and system 10 is calibrated for that particular calibration point 18, the GPS device may be removed from AOI 4 or used to calibrate a different calibration point 18. The GPS device or other device used to provide absolute or relative coordinates for a calibration point can be, but need not be left behind in AOI 4 after the cameras are calibrated.

In one example, e.g., shown in FIG. 1, a calibration target 28 is placed at each of the plurality of calibration points 18 and processor 20 determines the absolute coordinates of the calibration target 28 placed at each of the plurality of calibration points 18, which in turn allows for the determination of the absolute coordinates of each calibration point 18. In one embodiment, each calibration target 28 includes a GPS device for determining the absolute coordinates of the calibration target 28, where the GPS device transmits the absolute coordinates of calibration target 28 to processor 20 via network 22.

Examples of calibration targets 28 that can be used with system 10 of the present invention include small reflectors capable of reflecting visible and/or infrared light so that when calibration targets 28 are viewed by cameras 12, they are easily spotted. Calibration targets 28 can be any object that is visible in cameras 12 such that an operator setting up calibration of system 10 can center a cursor on the image of target 28, i.e. calibration pixel 24. Any object that is discernable within video image 16 of camera 12 may be used as a calibration target 28. Reflector stakes that are driven into the ground are particularly useful for this purpose. However, calibration targets 28 need not be a specially designed target, but rather could be a local object that is easily spotted by cameras 12, such as a particular tree or rock.

If system 10 is designed to automatically detect whether cameras 12 have shifted, as described below, then calibration targets 28 can be a high contrast target that can be tracked by system 10, such as a white round target that could be easily tracked by automated software. The size of each calibration target 28 generally will depend on the actual area that a pixel within camera image 16 represents within AOI 4, which in turn depends on the overall size of AOI 4, the overall visibility, and the position of cameras 12 with respect to AOI 4. In some examples, each calibration target 28 has the approximately the same size as a single pixel in camera image 16. For example, if each camera pixel represents a spot with approximately a 15 centimeter diameter, then each calibration target 28 can be circular or spherically shaped with a diameter of about 15 centimeters.

In one embodiment, calibration targets 28 may be a generally circular or spherical objects having a diameter of between about 15 centimeters and about 25 centimeters, such as a generally spherical object having an approximately 20 centimeter. In another embodiment, calibration targets 28 are common objects within AOI 4, such as rocks, that have been painted with a color that contrasts with the background. For example, if the background is predominantly green a yellow target may be preferred or if the background is predominantly tan, then a blue target may be preferred. In one embodiment, the color of calibration target 28 may be selected so that calibration target 28 will tend to blend in with the background within the visible spectrum so that calibration targets 28 will generally be difficult to see by the eye, but that will be easily discernable by cameras 12. For example, calibration target 28 may be solid black so that it is difficult to discern by the naked eye, but that will be easily picked up by either a black and white or an infrared camera 12. In one embodiment, calibration target 28 may be painted with paint that is treated to be visible to an infrared camera 12 but that is a visible color that essentially matches the background. In short, each calibration target 28 should be at least of sufficient size and contrast with the background to the given camera type to create a clearly discernable pixel for that camera type.

Calibration target 28 may be difficult to remove from AOI 4 so that, calibration targets 28 will remain at their selected calibration points 18 throughout operation of system 10. In some cases, however, calibration target 28 may move within AOI 4 or may be removed from AOI 4, in which case processor 20 can take additional steps to recalibrate system 10, as described in further detail below.

Although FIG. 1 shows one calibration target 28 for each calibration point 18 within AOI 4, i.e. a first calibration target 28A at first calibration point 18A, second calibration target 28B at second calibration point 18B, and so forth, other example system 10 can include a greater or fewer number of calibration targets 28 per calibration point 18. That is, other example systems can include a fewer number of calibration targets 28 than calibration points 18 and the calibration targets 28 can be moved to a different calibration point 18 once processor 20 associates the absolute coordinates of a particular calibration point 18 with the calibration pixel 24 seen in the image of each camera 12. In some examples, a single calibration target 28 or a fewer number of calibration targets 28 than calibration points 18 can be used to calibrate each calibration point 18 individually, i.e. by using a calibration target 28 to calibrate first calibration point 18A then moving the calibration target 28 to second calibration point 18B for calibration, and subsequently moving the calibration target 28 to third calibration point 18C for calibration, and so on.

An operator can manually move the calibration target 28 between calibration points 18, or the calibration target 28 can be automatically moved between calibration points, e.g., with a manned or an unmanned vehicle. Calibration of the system using a single or a fewer number of calibration targets 28 than calibration points 18 is possible because so long as cameras 12 are at a fixed location and position, once the absolute coordinates of a particular calibration point 18 is associated with calibration pixels 24, calibration target 28 does not need to remain physically associated with the calibration target 18. In one embodiment, once calibration is completed for each calibration point 18, the calibration targets 28 can be removed from AOI 4. However, in some examples, at least one calibration target 28 can remain within AOI 4 after calibration. Leaving at least one calibration target 28 within AOI 4 can be useful for providing verification that one or more cameras 12 have not been disturbed from the respective location.

An example of the use of only one calibration target, i.e., a common calibration target for each calibration point 18, is in the situation wherein AOI 4 is road 6 shown in FIG. 1. In this embodiment, a calibration target having a single pixel size in images 16 of each camera 12 can be placed on a vehicle that is driven along road 6. The absolute coordinates of the mounted calibration target can be determined using a GPS device mounted to the vehicle and wirelessly linked to processor 20 so that at regular intervals along road 6, processor 20 can determine the absolute coordinates of the calibration target at calibration points distributed along road 6 via the coordinates indicated by the GPS device at the respective calibration point along road 6. Processor 20 can associate the absolute coordinates of each calibration point with the position of a calibration pixel located along an image of road 6 within video image 16 of each camera 12, whereby at least two cameras view the vehicle driving down road 6.

If the interval of calibration points along road is small enough, a nearly-continuous line of calibration pixel reference points can be collected on road 6, allowing for geolocation of an OOI (e.g., the absolute coordinates of the OOI) moving along road 6. A similar method could be used with areas of interest of other geographies with one or more calibration targets 28 with an associated GPS device being moved to various calibration points 18 and then calibrated with central processor 20.

Calibration targets 28 can also be left as location benchmarks at each calibration point 18, as shown in FIG. 1, during operation of system 10. A location benchmark is particularly useful to detect and recalibrate system 10 to compensate for any shifting, vibration, or jostling of cameras 12. For example, if one of the plurality of cameras 12 is bumped or otherwise moved from the known location of the camera, processor 20 can detect that the position of the calibration pixels 24 within the image 16 of the shifted camera 12 has changed. For example, processor 20 can detect a change in the relative position of a calibration pixel 24 and a landmark within AOI 4 or a change in the relative position of two or more calibration pixels 24. When processor 20 detects this change, it orders that system 10 be recalibrated. Calibration is performed as described above, i.e. with processor associating the absolute coordinates of each calibration point 18 with a calibration pixel 24 in camera images 16. Thus, system 10 can compensate for a shift in cameras 12 during use of system 10.

Calibration targets 28 may remain in AOI 4 throughout operation of system 10. In some cases, one or more calibration targets 28 may be inadvertently or purposefully moved within AOI 4 or removed from AOI 4. If calibration targets 28 include a GPS device or another positioning system, as described below, processor 20 can simply be configured to detect changes in the absolute coordinate location of the moved calibration target 28 and use the absolute coordinates of the new location as a substitute calibration point 18, as long as calibration point 18 is still viewed within the FOR 14 of at least two cameras 12. Similarly, if a calibration target 28 is removed from AOI 4, processor 20 can be configured to detect the removal of the calibration target 28.

In one embodiment, processor 20 is configured to regularly track each calibration target 28 by rechecking the position of each calibration pixel 24 within camera images 16 and comparing the current position to a prior position of each calibration pixel 24 within each camera image 16. If the position of a calibration pixel 24 has changed due to the movement of a calibration target 28, processor 20 recalibrates system 10, as described above, with the new position of the moved calibration target 28 acting as a new calibration point 18. Similarly, processor 20 can be configured to regularly count the number of calibration pixels 24 viewed by each camera image 16, such that if a calibration target 28 is removed and a calibration pixel 24 is no longer shown within camera images 16, processor 20 will continue to use the last associated calibration point 18 and absolute coordinates that corresponded to the removed calibration target 28 in combination with the position of the associated calibration pixel 24 from that point forward.

The arrangement of calibration targets 28 within AOI 4 depends on the size, terrain, and shape of AOI 4. If AOI 4 is relatively small (e.g., the entire area can be walked on by foot by a human being without undue exertion), calibration targets 28 can be placed at calibration points 18 by a person on foot. If AOI 4 is relatively large, then it may be necessary for calibration targets 28 to be placed at calibration points 18 by a vehicle (e.g., a land or aerial vehicle) that enters AOI 4. Calibration targets 28 could also be placed by multiple people on foot or multiple vehicles, where each person or vehicle may place only a subset of the calibration targets 28 at one or more desired calibration points 18. In one embodiment, described above with respect to FIG. 1, the area of interest is a road 6 and a calibration target with an associated GPS device is mounted on a vehicle that is driven along road 6.

Many other methods could be used to place calibration targets 28 at calibration points 18 within AOI 4.

Cameras 12 can be any camera that can be linked via network 22 to processor 20 via wired or wireless communication. Cameras 12 may be chosen specifically to be used as tracking cameras within system 10, or cameras 12 my be chosen as ad hoc "cameras of opportunity" from any general available stock and need not be of the same model or type. Cameras 12 each have sufficient resolution capabilities to generate an image in which calibration points 18 are visible, in order to permit processor 20 to calibrate system 10 by at least associating the absolute coordinates of calibration points 18 with a calibration pixel 24 in the video images 16 produced by cameras 12. Examples of cameras 12 that can be used with system 10 of the present invention include visible light, infrared, and thermal imaging cameras.

The number of cameras 12 of system 10 can be modified to accommodate the number of cameras necessary to sufficiently identify OOI 2 within AOI 4, which can vary depending on the terrain of AOI 4. For example, if AOI 4 is generally flat with little or no visual obstructions to block the sightlines of cameras 12, then two cameras 12A, 12B are all that are required if it assumed that OOIs remain on the ground because two cameras 12A, 12B provide two vantage points to a OOI, allowing central processor 20 to determine the location of the OOI along the generally flat AOI 4. However, if AOI 4 includes objects that block the sightlines of one or more cameras 12, then additional cameras 12 are required so that every point within AOI 4 is covered by the FOR 14 of at least two cameras 12.

Another factor that can affect the number of cameras 12 selected to be implemented as part of system 10 is whether or not the terrain of AOI 4 is already known. For example, if the terrain of AOI 4, including elevation data, has previously been mapped, two cameras 12A, 12B may be sufficient (assuming no visual sightline obstructions, as described above) for processor 20 generate absolute coordinates of OOI 2 because processor 20 can use the previously acquired terrain data to determine the location of OOI 2 because the terrain data will allow processor 20 to reconcile perceived elevation with the known terrain to determine that OOI 2 is actually located on the ground on a hill or rise rather than being located in the air above AOI 4. However, if the terrain is unknown and is not generally flat, than at least a third camera 12C may be necessary, wherein the third camera 12C is off-plane with respect to the other two cameras 12B, 12C, in order to provide central processor 20 a third vantage point of an OOI to calculate positional coordinates and elevation of OOI. Finally, if it cannot be assumed that OOIs will be on the ground, e.g., if an aerial OOI is a possibility, at least three cameras 12A, 12B, 12C may be necessary, with third camera 12C being off-plane from the first two cameras 12A, 12B, to determine the elevation of OOI 2 (e.g., to determine when an OOI is located above the ground).

System 10 is not limited to the number of cameras 12 listed above, however. Rather, any number of cameras 12 above the minimums described above will increase the accuracy and reliability of system 10. For example, for the AOI 4 shown in FIGS. 1 and 2 that is generally flat and planar, although only two cameras 12A, 12B are required, more cameras can be included. A third camera 12C would provide several benefits, including ensuring total coverage with the FOR 14 of at least two cameras 12 for every point in AOI 4, improved accuracy of the OOI geolocation calculation performed by processor 20 because additional vantage points are provided, and redundancy in the event that one of the cameras 12 fails. Three cameras also enables processor 20 to perform a triangulation technique to better identify the absolute coordinates of OOI 2.

Additional cameras beyond the third camera 12C, and even a fourth camera would provide even more redundancy and further assurance of full coverage and geolocation accuracy. The desire to include additional cameras for better accuracy and system redundancy can be balanced with the added cost of additional cameras, the need to place and calibrate additional cameras, the bandwidth capacity of network 22 to transmit the video image data of additional cameras, and the processing capacity of processor 20 to perform calibration and geolocation calculations for each of the cameras 12 that are desired to be installed.

As shown in FIG. 1, cameras 12 should be separated from each other by an angle θ with respect to the center of AOI 4, whereby angle θ is large enough to avoid ambiguous location calculations by processor 20. In order to avoid ambiguities, angle θ between any two particular cameras (such as between first camera 12A and second camera 12B, as shown in FIG. 1, or between first camera 12A and third camera 12C) is between about 10° and about 180°, such as between about 30° and about 60°, or about 45°.

Figure 3:
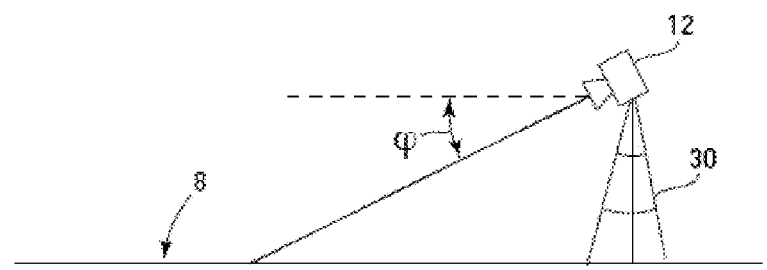
FIG. 3 is a side view of an example camera of the imaging system of FIG. 2.

FIG. 3 is a side view of an example camera of the imaging system of FIG. 2. In the example shown in FIG. 3, each camera 12 is elevated above ground level 8 of AOI 4, which permits field of regard 14 of each camera 12 to better capture AOI 4 and to avoid ambiguities in calculating the location of an OOI along the ground. As previously indicated, cameras 12 are positioned to view AOI 4 such that each point within AOI 4 is covered by the field of regard 14 of at least two cameras 12.

The extent of elevation of each camera 12 is driven by available resources (e.g., availability of poles, towers, trees, or other features to which cameras 12 can be affixed at an elevated position relative to ground level 8) and by the desired accuracy of system 10. In one embodiment, shown in FIG. 3, each camera 12 is elevated to provide a look down angle φ of between about 10° and about 90°, such as between about 15° and about 45°. In one embodiment, at least one camera 12 is elevated such that its look down angle is about 90° or as close as possible to 90° so that the camera 12 is essentially looking straight down onto AOI 4, which would provide for a useful perspective on AOI 4 to accurately geolocate OOI 2 within the AOI 4. However, placing a camera directly above AOI 4 can be logistically and technically difficult due to the lack of structure to which at least one of the cameras 12 can be attached. In general, cameras 12 can be elevated above AOI 4 by mounting cameras 12 on supports, such as tower 30 shown in FIG. 3, poles, trees, rises in terrain such as hills or canyon edges, or other structures that may be present within AOI 4.

Because cameras 12 generate an image of AOI 4, including calibration targets 28, and processor 20 performs the calculations necessary to calibrate system 10 and geolocate OOI 2, cameras 12 can be relatively inexpensive cameras that are readily available to users of system 10, often referred to as "cameras-of-opportunity." The ability to use cameras-of-opportunity allows for great flexibility when setting up and maintaining system 10, because special cameras need not be purchased, designed, or maintained solely for use in system 10. For example, in a military setting, several cameras-of-opportunity may already be available for general use at a particular facility when it becomes apparent that a system 10 is desirable. These cameras-of-opportunity can be set up as cameras 12 of system 10 in the locations necessary to provide the fields of regard 14 that covers AOI 4 and linked via network 22 to central processor 20. This method of ad hoc setup allows for flexible and rapid deployment of system 10, which is particularly crucial in military operations.

Processor 20 may also be configured to generate an indication indicating the presence of OOI 2 in AOI 4, which can be useful in, for example, a military application of system 10. The indication can be transmitted to a user, e.g., in the form of an alert or alarm. For example, if OOI 2 enters AOI 4, processor 20 is configured to detect the change in camera images 16 by detecting the presence of OOI image 26 that was not in camera images 16 before. Once it is determined that OOI 2 is present, processor 20 can trigger a notification to an operator within a base camp. Central processor may also be configured to direct a more powerful imaging system, such as an imaging satellite or spy airplane imaging system, to focus on OOI 2 within AOI 4 using the absolute coordinates of OOI 2 determined using calibration points 18. Central processor also may be configured to pass the absolute coordinates of OOI 2 to a targeting system for deployment of guided munitions at or near OOI 2.

Figure 5:
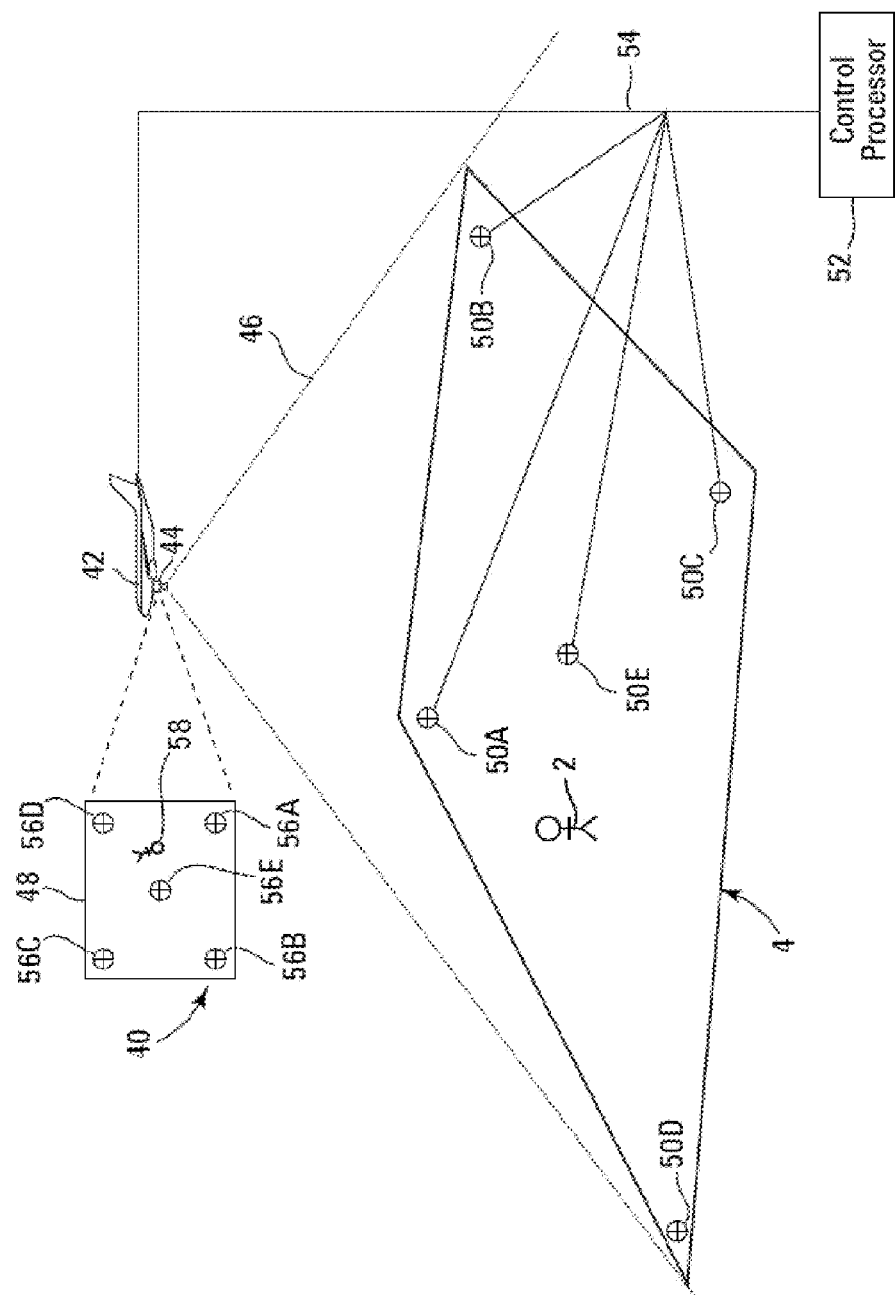
FIG. 5 is a perspective view of another example geolocation system.

FIG. 5 is a conceptual illustration of another example surveillance system 40, which includes aerial vehicle 42 flying over AOI 4. Aerial vehicle 42 comprises a camera 44 with a field of regard (FOR) 46 covering AOI 4, where camera 44 captures a video image 48 of FOR 46. A plurality of calibration targets 50 are placed within AOI 4, and the absolute coordinates of each calibration target 50 is known. Each calibration target 50 becomes a calibration point within AOI 4, similar to calibration points 18 described with respect to the embodiment of FIGS. 1 and 2. In the embodiment shown in FIG. 5, system 40 includes five calibration targets 50A, 50B, 50C, 50D, and 50E, which are similar to the five calibration targets 28A, 28B, 28C, 28D, and 28E in system 10.

Processor 52, which is similar to processor 20 of system 10 (FIG. 1), is connected to camera 44 by network 54, such that video image 48 captured by camera 44 is transmitted to processor 52 (directly or indirectly). Processor 52 determines the absolute coordinates of each calibration target 50 using any suitable technique, such as the techniques described above for determining the absolute coordinates of calibration targets 28 by processor 20. Calibration targets 50 can transmit their respective absolute coordinates via network 54 or a separate network (not shown in FIG. 5).

Processor 52 is configured to calibrate system 40 by associating the absolute coordinates of each of the plurality of calibration targets 50 with a calibration pixel 56 corresponding to an image of each calibration target 50 observed in the video image 48 camera 44. In the embodiment shown in FIG. 5, video image 48 of camera 44 contains calibration pixels 56A, 56B, 56C, 56D, and 56E that correspond to calibration targets 50A, 50B, 50C, 50D, and 50E, respectively. Processor 52 is further configured to geolocate the absolute coordinates of OOI 2 within AOI 4 by comparing the position of an image 58 of OOI 2 in video image 48 to the calibration pixels 50A in video image 48 of camera 44, using techniques similar to those described above with respect to FIG. 1.

The number of aerial vehicles 42 that are necessary for full functionality of system 40 depends on prior knowledge of the terrain of AOI 4 and whether it can be assumed that an OOI 2 is a ground target or not. For example, if the terrain of AOI 4 is known such that a three-dimensional terrain map is accessible by processor 52 and processor 52 determines that OOI 2 is a ground target (e.g., based on user input), only a single aerial vehicle 42 may be necessary to generate absolute coordinates for OOI 2. However, if either the terrain of AOI 4 is not known or if OOI 2 could be an aerial target, at least two aerial vehicles 42 with cameras 44 may be necessary to perform accurate geolocation calculations to generate the absolute coordinates of OOI 2 within AOI 4. The aerial vehicles 42 may have different elevations relative to a ground surface of AOI 4.

Also, if terrain features of AOI 4 can block the view of the camera 44 of a single aerial vehicle 42, then at least two aerial vehicles 42 can be used to ensure that the entirety of AOI 4 can be seen by the camera 44 of at least one aerial vehicle 42. If this is the case, then the two or more aerial vehicles 42 can be sufficiently spaced from each other so that every point within AOI 4 is seen by at least one of the cameras 44 on aerial vehicles 42.

Aerial vehicles 42 include a GPS device or other means of determining the absolute position of each aerial vehicle 42 so that processor 52 has an accurate knowledge of the vantage point of aerial vehicles 42 when performing geolocation calculations. Aerial vehicles 42 can be, for example, unpiloted or unmanned aerial vehicles (UAVs), sometimes referred to as "drones," with a mounted camera 44 and GPS device. UAVs can be programmed to fly in a set pattern over AOI 4.

As described above with respect to cameras 12 of system 10, the number of aerial vehicles 42 and cameras 44 are not limited to the quantities described herein. In addition, additional, any suitable number aerial vehicles 42 and cameras 44 may be employed with system 40. The desired for increased accuracy and redundancy can be balanced with added costs and the necessary network bandwidth and processor 52 capabilities that occurs with the addition of each new aerial vehicle 42 and camera 44.

Calibration targets 50 of system 40 are generally the same as calibration targets 28 described above with respect to system 10. In some examples, such as examples in which aerial vehicle 42 is moving relative to AOI 4 (i.e., the relative location between aerial vehicle 42 and a point within AOI 4 can be constantly changing), calibration targets 50 are configured to remain substantially in place within AOI 4 throughout the operation of system 40. The substantially stationary calibration targets 50 act as location benchmarks with which processor 52 compensates for the motion of aerial vehicle 42. In some examples, the factors that determine the number of calibration targets 50 needed for system 40 are similar to those for the number of calibration points 18 described above with respect to system 10. Namely, the number of calibration targets 50 needed depends on the terrain of OOI 2. In one embodiment, at least four calibration targets 50 are included in system 40, such as at least about eight calibration targets or at least about 10 calibration targets.

The remaining aspects of system 40 are generally the same as their counterparts in system 10. For example, camera 44 is generally the same as each camera 12 of system 10, e.g., camera 44 can be an inexpensive visible, thermal, or infrared camera-of-opportunity. Similarly, central processor 52 is generally the same as central processor 20 and network 54 is generally the same as network 22.

The techniques described in this disclosure, including those attributed to processors 20, 52 may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, magnetic data storage media, optical data storage media, or the like. The instructions may be executed to support one or more aspects of the functionality described in this disclosure.

This disclosure refers to illustrative embodiments that are not meant to be construed in a limiting sense. Various modifications of the illustrative embodiments, as well as additional embodiments of the invention, will be apparent to persons skilled in the art upon reference to this description.

The invention claimed is:

1. A system comprising:
one or more cameras, wherein a camera of the one or more cameras is configured to capture a video image of a field of regard, wherein each point within an area of interest is covered by the field of regard;
a plurality of calibration points within the area of interest;
a memory; and
a processor configured to:
calibrate the system by at least associating coordinates of each calibration point of the plurality of calibration points with a calibration pixel corresponding to an image of the respective calibration point in the video image captured by the camera, wherein the processor is configured to generate coordinates of an object of interest in the area of interest by at least comparing a position of an image of the object of interest in the video image to the calibration pixels in the video image,
store a location history of the object of interest in the memory, the location history being based on the coordinates of the object of interest over time,
compare the location history of the object of interest to one or more template profiles of permitted objects within the area of interest, and
determine whether the object of interest corresponds to one or more of the permitted objects based on the comparison.

2. The system of claim 1, further comprising a calibration target placed at each calibration point of the plurality of calibration points, wherein the processor is configured to determine the coordinates of each calibration point of the plurality of calibration points by at least determining coordinates of the calibration target when the calibration target is placed at the respective calibration point.

3. The system of claim 1, further comprising a plurality of calibration targets, wherein each calibration target is placed at a respective calibration point of the plurality of calibration points, wherein the processor is configured to determine the coordinates of each calibration point of the plurality of calibration points by at least determining coordinates of the respective calibration target.

4. The system of claim 1, wherein the processor is configured to determine the coordinates of each calibration point of the plurality of calibration points by at least referencing a terrain database comprising information about coordinates of a plurality of geographic points within the area of interest.

5. The system of claim 1, wherein the one or more cameras comprises a plurality of cameras, wherein the cameras of the plurality of cameras are separated from each other at an angle of between about 10 ° and about 180 ° with respect to the center of the area of interest.

6. The system of claim 1, wherein at least one camera of the one or more cameras is elevated above the area of interest at an angle of between about 10 ° and about 90 ° from horizontal.

7. The system of claim 1, wherein the plurality of calibration points comprises at least three calibration points.

8. A method for geolocating an object, the method comprising:
determining coordinates of each calibration point of a plurality of calibration points within an area of interest;
with a camera having a field of regard, capturing a video image of the field of regard, wherein the area of interest is covered by the field of regard, and wherein each calibration point of the plurality of points comprises a single pixel within the video image;
associating the coordinates of each calibration point with a calibration pixel corresponding to an image of the calibration point in the video image;
determining a geolocation of an object of interest within the area of interest by at least comparing, with a processor, a position of an image of the object of interest within in the video image to the calibration pixels within the video image; and
determining whether the object of interest corresponds to one or more permitted objects within the area of interest by at least comparing, with the processor, a location history of the object of interest to the one or more template profiles of the permitted objects, the location history being stored by a memory and being based on the geolocation of the object of interest over time.

9. The method according to claim 8, wherein each calibration point of the plurality of calibration points comprises a calibration target.

10. The method according to claim 8, further comprising providing the geolocation of the object of interest within the area of interest to a user.

11. The method according to claim 8, further comprising directing an imaging system to focus on the object of interest within the area of interest.

12. The method according to claim 8, further comprising determining coordinates of the object of interest within the area of interest and providing the coordinates to a system that deploys guided munitions.

13. A system comprising:
an aerial vehicle configured to fly over an area of interest, the aerial vehicle comprising a camera with a field of regard covering the area of interest, wherein the camera is configured to capture a video image of the field of regard;
a plurality of calibration targets placed within the area of interest, wherein the coordinates of each of the calibration targets are known;
a memory; and
a processor configured to:
calibrate the system by at least associating coordinates of each calibration target of the plurality of calibration targets with a calibration pixel corresponding to an image of the respective calibration target in the video image, wherein the processor is configured to geolocate the coordinates of an object of interest in the area of interest by at least comparing a position of an image of the object of interest in the video image to the calibration pixels in the video image, store a location history of the object of interest in the memory, the location history being based on the coordinates of the object of interest over time, compare the location history of the object of interest to one or more template profiles of permitted objects within the area of interest, and determine whether the object of interest corresponds to one or more of the permitted objects based on the comparison.

14. The system of claim 13, wherein the aerial vehicle is an unmanned aerial vehicle.

15. The system of claim 13, wherein the coordinates of each calibration target comprises absolute coordinates, and wherein each calibration target of the plurality of calibration targets comprise a device configured to indicate the absolute coordinates of the respective calibration target.

16. The system of claim 1, wherein the coordinates of each of the plurality of calibration points includes absolute coordinates.

17. The system of claim 16, further comprising one or more devices configured to indicate the absolute coordinates of the plurality of calibration points.

18. The system of claim 1, wherein the processor is further configured to generate the coordinates of the object of interest in the area of interest by at least interpolating between the coordinates of at least three calibration points of the plurality of calibration points.

19. The method of claim 8, wherein determining the geolocation of the object of interest within the area of interest further comprises interpolating between the coordinates of at least three of the plurality of calibration points.

* * * * *